Patented May 27, 1952

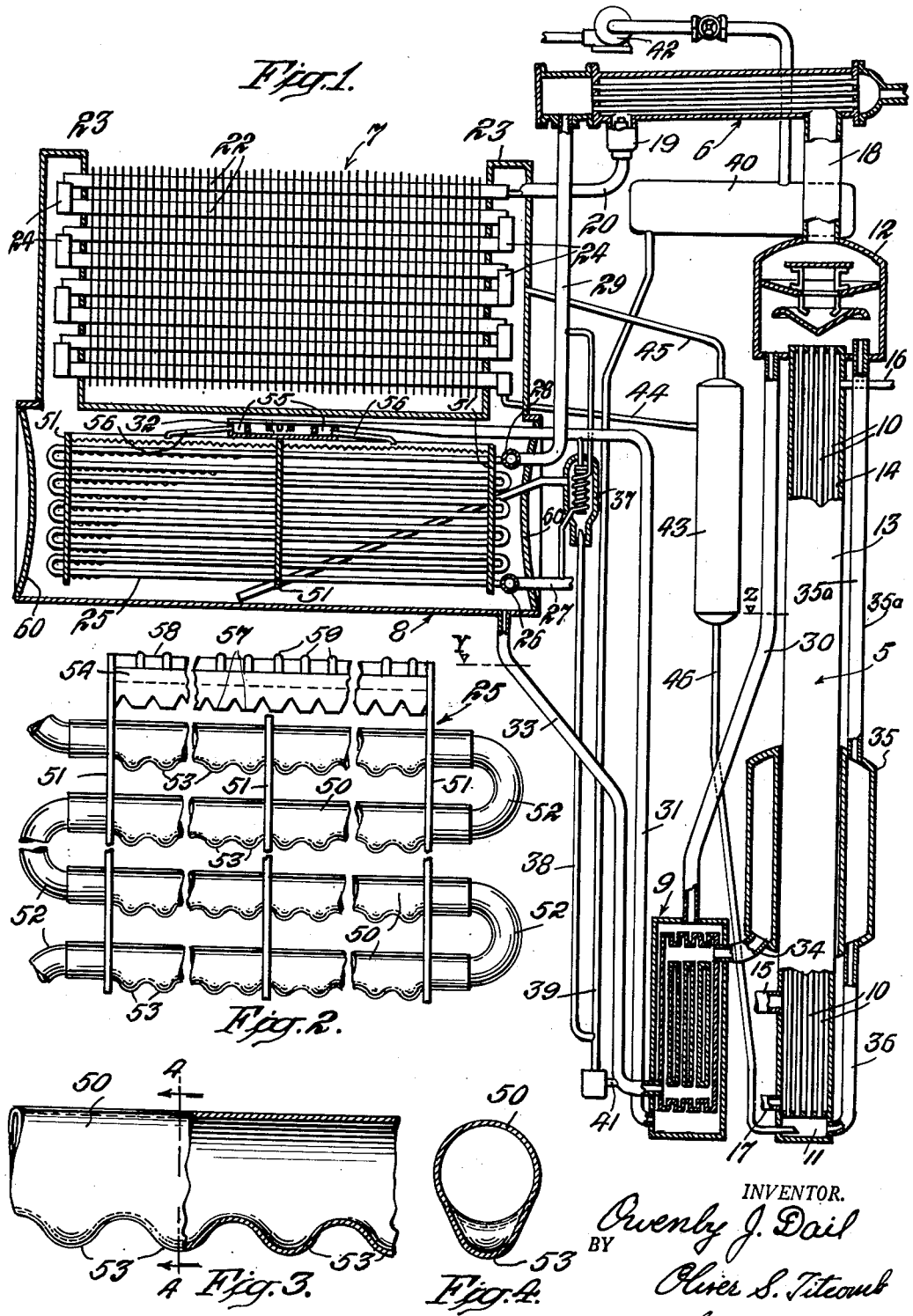

2,598,037

UNITED STATES PATENT OFFICE 2,598,037

ABSORPTION REFRIGERATION

Owenby J. Dail, Evansville, Ind., assignor to Servel, Inc., New York, N. Y., a corporation of Delaware Application July 2, 1949, Serial No. 102,863

2 Claims. (Cl. 62—119)

The present invention relates to heat exchange apparatus and more particularly to absorbers for absorption refrigeration systems.

The present invention has other applications but is particularly adapted for use in an absorber of the type illustrated and described in United States Letters Patent to A. R. Thomas et al. No. 2,301,232 issued November 10, 1942 and entitled Refrigeration. The absorber is in the form of a vessel having a bank of coils arranged in side by side relationship therein. Each coil comprises a plurality of tubes arranged one over the other in a vertical plane and absorption solution delivered onto the top of each tube spread over the surface of the tube and drips from the bottom thereof onto the top of the next lowermost tube successively from the top to the bottom of the coil. In such absorbers great difficulty has been experienced in maintaining a uniform distribution of liquid on the surface of the tubes as the liquid tends to flow along the tubes and drip onto the next lower tube from only a few selected points. A number of drop former constructions have been used which have overcome this difficulty to a considerable degree but their performance varies and they are expensive to manufacture and assemble.

One of the objects of the present invention is to provide an absorber tube construction which produces a uniform distribution of liquid on the exterior surface thereof and creates a turbulence in the fluid flowing through the tubes.

Another object is to provide an absorber tube of the type indicated in which the wall of the tube is deformed to provide spaced interior and exterior projections on the bottom of the tube.

Another object is to provide an absorber tube of the type indicated in which the exterior projections constitute a plurality of spaced drop formers for producing a uniform distribution of solution as it drips onto the next lowermost tube and the interior projections constitute a plurality of spaced dams for impeding and agitating the cooling medium flowing therethrough.

Still another object is to provide an absorber tube of the type indicated which may be economically manufactured and easily and quickly assembled.

These and other objects will become more apparent from the following description and drawing in which like reference characters denote like parts throughout the several views. It is to be expressly understood, however, that the drawing is for the purpose of illustration only and not a definition of the limits of the invention, reference being had for this purpose to the appended claims. In the drawing:

Fig. 1 is a diagrammatic view of an absorption refrigeration system having an absorber incorporating the novel features of the present invention.

Fig. 2 is an enlarged view of one of the absorber coils showing the substantially horizontal tubes of the coil arranged one over the other in a vertical plane with drop forming projections on the bottom of each tube.

Fig. 3 is a further enlarged part sectional view of a portion of one tube showing the corrugations in the bottom of the tube wall, and Fig. 4 is a sectional view of the tube taken on line 4—4 of Fig. 3.

In the drawing the present invention is shown applied to a vacuum type absorption refrigeration system utilizing water as a refrigerant and a salt solution as an absorbent and is generally similar to that illustrated and described in the United States Letters Patent to A. R. Thomas et al. No. 2,301,232, referred to above. The refrigeration system comprises a generator 5, a condenser 6, and evaporator 7, an absorber 8 and a heat exchanger 9 interconnected to provide circuits for refrigerant and absorbent.

The generator 5 constitutes a vapor liquid-lift and comprises a plurality of upright tubes 10 connected at their lower ends to an inlet chamber 11 and at their upper ends to a separating chamber 12. The tubes 10 are enclosed in a jacket 13 to provide a heating chamber 14 therebetween. Steam is supplied to the heating chamber 14 from any suitable source through a conduit 15. A vent pipe 16 connects the chamber 14 to the atmosphere at a point remote from the inlet conduit 15 to maintain the steam in the heating chamber at atmospheric pressure. A condensate drain 17 is provided adjacent the lower end of the heating chamber 14. When steam is supplied to the heating chamber 14 its heat is transferred through the tubes 10 and expels refrigerant vapor, such as water, from absorption solution, such as a water solution of a hygroscopic salt, and the expelled vapor acts to lift the solution in the tubes by a climbing film vapor lift action to the separating chamber 12.

The separating chamber 12 of the generator 5 is connected to the condenser 6 by a conduit 18 and the condenser, in turn, is connected to the evaporator 7 by a conduit including a liquid receiving vessel 19 and a pipe 20. The vessel 19 in the conduit has an orifice (not shown) of a size to pass all of the liquid refrigerant condensed in the condenser 6 and permit a limited flow of refrigerant vapor to purge uncondensable gases from the condenser as claimed in a copending application for United States Letters Patent of Norton E. Berry, Serial No. 725,000 filed January 29, 1947 and now Patent No. 2,563,575 of August 7, 1951.

Evaporator 7 comprises a plurality of substantially horizontal tubes 22 extending between headers 23. Cups 24 in the headers 23 receive refrigerant flowing from the end of each tube 22 and direct it into the next lowermost tube so that the refrigerant flows successively through the tubes from the top to the bottom of the evaporator. The headers 23 open into the top of the absorber 8 to permit refrigerant vapor evaporated in the evaporator to flow to the absorber. Mounted in the absorber 8 is a bank of cooling coils 25, later to be described in detail, to which cooling water is supplied through a header 26 and supply pipe 27 from any suitable source such as a city water main, cooling tower or the like. Cooling water from the bank of cooling coils 25 is delivered through a header 28 and conduit 29 to the inlet of the condenser 6.

Absorption solution weak in refrigerant or, in other words, the concentrated salt solution flows by gravity from the separating chamber 12 to the top of the absorber 8 in a path of flow including the conduit 30, heat exchanger 9, conduit 31 and liquid distributor 32. The absorption solution is divided by the liquid distributor 32 for flow over the cooling coils 25 in the absorber 8. Absorption solution strong in refrigerant or, in other words, dilute salt solution flows by gravity from the bottom of the absorber 8 to the inlet chamber 11 of the generator 5 in a path of flow including conduit 33, heat exchanger 9, conduit 34, annular reservoir vessel 35 and conduit 36. The vessel 35 is positioned above the base of the generator 5 to continuously receive absorption solution as it flows from the absorber 8 and deliver the solution to the inlet chamber 11 of the generator 5 while maintaining a hydrostatic reaction head on the solution in the tubes 10 of the generator 5. A vent tube 35a connects the top of the reservoir vessel 35 and separating chamber 12 to equalize the pressure therebetween.

The generator 5 and condenser 6 operate at a pressure corresponding to the vapor pressure of the refrigerant at its condensing temperature and the evaporator 7 and absorber 8 operate at a lower pressure corresponding to the vapor pressure of refrigerant in the absorbent at the temperature of the absorber. The difference in pressure in the condenser 6 and evaporator 7 is maintained by the orifice in the vessel 19 and the difference in pressures in the absorber 8 and generator 5 is maintained by liquid columns in the conduits 31 and 33. The liquid level in the conduit 33 is indicated by the reference character Y while the liquid level in the conduit 30 connected to the conduit 31 through the heat exchanger 9 is indicated by the reference character Z.

A purging device 37 of the type described and claimed in United States Letters Patent to Charles A. Roswell No. 2,384,861 issued September 18, 1945 continuously withdraws non-condensable gases from the absorber 8 and transfers them to an inactive part of the system. Suffice it to state herein that the purging device 37 is in the form of an auxiliary absorber connected to withdraw non-condensable gases from the absorber 8 and deliver gases between alternate slugs of absorption solution through a fall tube pump 38 to the lower end of a riser tube 39. The non-condensable gases ascend in riser tube 39 to a storage vessel 40 and the absorption solution flows through the connection 41 to the return conduit 33. The non-condensable gases may be removed from the storage vessel 40 from time to time by an exhaust pump 42.

A concentration control vessel 43 of the type described and claimed in United States Letters Patent to Lowell McNeely No. 2,465,904 issued March 29, 1949 is connected to the lowermost cup 24 of the evaporator 7 by a conduit 44 and to a header 23 of the evaporator 7 by a conduit 45. The bottom of the concentration control vessel 43 is connected to the inlet chamber 11 of the generator 5 by a conduit 46. During operation of the refrigeration system a quantity of liquid refrigerant, water, will be stored out of solution in a liquid column in conduit 46 and concentration vessel 43 and the height of the liquid column and quantity of liquid stored in the concentration vessel will vary with variations in the difference in pressure.

In accordance with the present invention a construction is provided for effecting a uniform distribution of absorption solution over the exterior surfaces of tube sections 50 in the absorber 8 and a turbulence in the liquid flowing therethrough. Tube sections 50 are arranged one over the other in vertical rows and connected in any suitable manner for the flow of cooling medium therethrough. In the illustrated embodiment the tube sections 50 of each row are connected in series to provide a bank of individual coils 25 of serpentine form. The coils 25 may be made from a continuous tube with reversed bends, but as shown in Fig. 2 a plurality of tube sections 50 are mounted in spaced bracket plates 51 with the ends of adjacent sections connected by U-shaped connectors 52. Each of the tube sections 50 has its wall deformed to provide a sinuously curved or undulating bottom with spaced depending projections 53. The tube sections 50 may be deformed in any suitable manner as by expanding portions of their wall hydraulically. For example, each tube section 50 may be inserted into a suitable die for restraining deformation of its wall except at certain spaced points along one side, plugging the ends of the tube, filling the tube with liquid and then forcing a piston into the tube to displace liquid and cause an expansion of the portions of the tube unrestrained by the die. The tube wall may be deformed to produce projections 53 of other shapes but in the embodiment illustrated in Figs. 3 and 4 the bottom of the wall is deformed to provide corrugations with alternating hills and valleys on both the interior and exterior of the tube. In Figs. 3 and 4 of the drawing the amount of deformation is exaggerated to clearly illustrate the corrugations and to show the projections 53 as depending below the normal periphery of the tube around approximately one-quarter of its circumference.

Mounted between the endmost supporting plates 51 is a tank 54 constituting a part of the liquid distributor 32. The liquid distributor is illustrated and described in detail in the Thomas et al. Patent No. 2,301,232, referred to above. Suffice it to state herein that the liquid distributor 32 comprises a wier box for dividing the absorption liquid delivered from conduit 31 into separate compartments 55. The liquid in each compartment 55 then flows by gravity through a tube 56 into a tank 54. Each side of each tank 54 overlies one of the coils 25 and has a depending portion provided with serrations 57 at its lower edge. A U-shaped siphon plate 58 overlies the top of each side wall of tank 54 and has a plurality of spaced capillary grooves 59 for siphoning predetermined quantities of liquid from the tank which runs down the depending side wall of the tank and drips from the serrations 57 onto the top tube section 50 of a coil 25.

Each coil 25 is asembled by inserting a plurality of the tube sections 50 through suitable openings in the supporting plates 51 in vertical alignment one over the other. The tube sections 50 may extend at any desired angle to the horizontal but in the illustrated embodiment they are shown substantially horizontal. The end connectors 52 are then inserted in the ends of adjacent tubes and sealed therein as by brazing, welding or the like to join the plurality of tubes into a single continuous coil. A bank of such coils 25 is assembled in side by side relationship in supporting plates 51, the lower ends of the coils 25 connected by the header 26 having a spud for the supply conduit 27 and the upper ends of the coils connected by the header 28 having a spud for the outlet conduit 29. The whole assembly is inserted through an open end of the absorber 8 and the ends of the absorber then closed by brazing or welding end plates 60 thereon and brazing or welding the spuds in the end plates. One form of the construction having now been described in detail the mode of operation is explained as follows.

Steam supplied to the heating chamber 14 of the generator 5 through conduit 15 heats the solution in tubes 10 and expels refrigerant from absorbent and the expelled vapor acts to lift the solution in the tubes by vapor lift action. Refrigerant vapor flows from the separating chamber 12 through conduit 18 to the condenser 6 where the refrigerant is liquefied. Liquid refrigerant flows by gravity from the condenser 6 through the liquid receiving vessel 19 and conduit 20 into the uppermost tube of the evaporator 7 and then flows by gravity through successive evaporator tubes and evaporates therein at low pressure to produce a refrigerating effect. Refrigerant vapor evaporated into evaporator 7 flows through the headers 23 into the absorber 8 where it is absorbed in absorption solution.

Absorption solution flows by gravity from the separating chamber 12 of the generator 5 to the liquid distributor 32 in the absorber 8 in a path of flow including the conduit 30, heat exchanger 9, and conduit 31. The liquid distributor 32 divides the absorption solution weak in refrigerant and delivers it to the separate tank 54 where it is fed through the capillary groves 59 of the siphon plate 58 onto the outside walls of each tank. Solution flows by gravity to the serrated bottom edge 57 of the side wall and drips therefrom at spaced points onto the top of the uppermost tube 50 of a coil 25. The absorption solution flows by gravity over the exterior surface of the uppermost tube 50 to form a film of the solution thereon and accumulates on the depending projections 53 at the bottom of each tube where it drips onto the top of the next lowermost tube. The absorption solution flows by gravity from the top to the bottom of each coil 25 and drips from each tube section 50 onto the next lowermost tube section at a series of spaced points to provide a uniform distribution of the solution over the exterior surface of the coil. Thus, the bank of absorber coils 25 provides a relatively large gas and liquid contact surface for absorbing refrigerant vapor into solution.

Simultaneously, cooling medium supplied through conduit 27 and header 26 flows upwardly through the coils 25. Due to the corrugated bottoms of the absorber tube sections 50, the flow of cooling medium is impeded which produces turbulence and a more uniform distribution of the cooling medium in the tube to improve the transfer of heat of absorption from the solution to the cooling medium.

It will now be observed that the present invention provides an absorber tube of improved construction for maintaining a uniform distribution of solution on the exterior surfaces of the longitudinal tube sections and a turbulence in the cooling medium flowing through the tubes. It will also be observed that the present invention provides spaced depending projections on the bottom of the tube produced by deforming the wall of the tube at one side. It will still further be observed that the present invention provides an absorber tube of the type indicated which may be economically manufactured and easily and quickly assembled.

While a single embodiment of the invention is herein illustrated and described, it will be understood that modifications may be made in the construction and arrangement of elements and in the form and construction of the depending projections on the absorber tubes without departing from the spirit or scope of the invention. Therefore, without limitation in this respect the invention is defined by the following claims.

I claim:

1. In an absorption refrigeration system having a generator, a condenser, an evaporator and an absorber interconnected for the circulation of refrigerant and absorbent, said absorber comprising a vessel connected to receive refrigerant vapor from the evaporator, a coil in the vessel having a plurality of tube sections arranged one above the other in a vertical plane, means for delivering absorption solution onto the top of the uppermost tube section for gravity flow over the exterior surface of each tube from the top to the bottom of the coil, conduits for delivering cooling medium for flow through the interior of the coil, and the wall of each tube section in the absorber having a smooth top portion on which drops of liquid spread equally in all directions to form and maintain a continuous film over the entire wall surface and an undulating bottom portion providing alternate hills and valleys on the interior of the tube to increase turbulence of cooling fluid flowing therethrough and a series of spaced projections on the exterior of the tube from which absorption solution drips onto the top of the next lowermost tube to provide for uniform distribution of absorption solution.

2. Refrigeration apparatus including structure for effecting heat transfer comprising a plurality of tube sections arranged one over the other in a vertical plane, means for delivering liquid at spaced points along the top of the uppermost tube section for gravity flow over the exterior surface of each tube section from the top to the bottom of the structure, conduit means for delivering fluid for flow through the interior of the tube sections, the wall at the top portion of each tube section extending parallel to its axis and curving outwardly and downwardly at each side on which drops of liquid spread equally in all directions to form and maintain a continuous film over the entire surface of the tube section, and the wall at the bottom portion of each tube section undulating longitudinally thereof to provide alternate hills and valleys on the interior of the tube section to increase turbulence of the fluid flowing therethrough and a series of spaced projections on the exterior of the tube section from which liquid drips onto the top of the next lowermost tube section to maintain uniform distribution of the liquid.

OWENBY J. DAIL.

REFERENCES CITED

The following references are of record in the file of this patent:

UNITED STATES PATENTS

| Number | Name | Date |
| --- | --- | --- |
| 628,150 | Tellier | July 4, 1899 |
| 2,318,621 | O'Brien | May 11, 1943 |
| 2,399,916 | Edberg | May 7, 1946 |

FOREIGN PATENTS

| Number | Country | Date |
| --- | --- | --- |
| 16,248 of 1910 | Great Britain | 1891 |
| 23,576 | Great Britain | Oct. 11, 1910 |